March 9, 1965  R. LAUMONT  3,172,366
HYDRAULIC ENERGY CONVERTING DEVICE
Filed July 13, 1961  2 Sheets-Sheet 1

INVENTOR:
ROGER LAUMONT

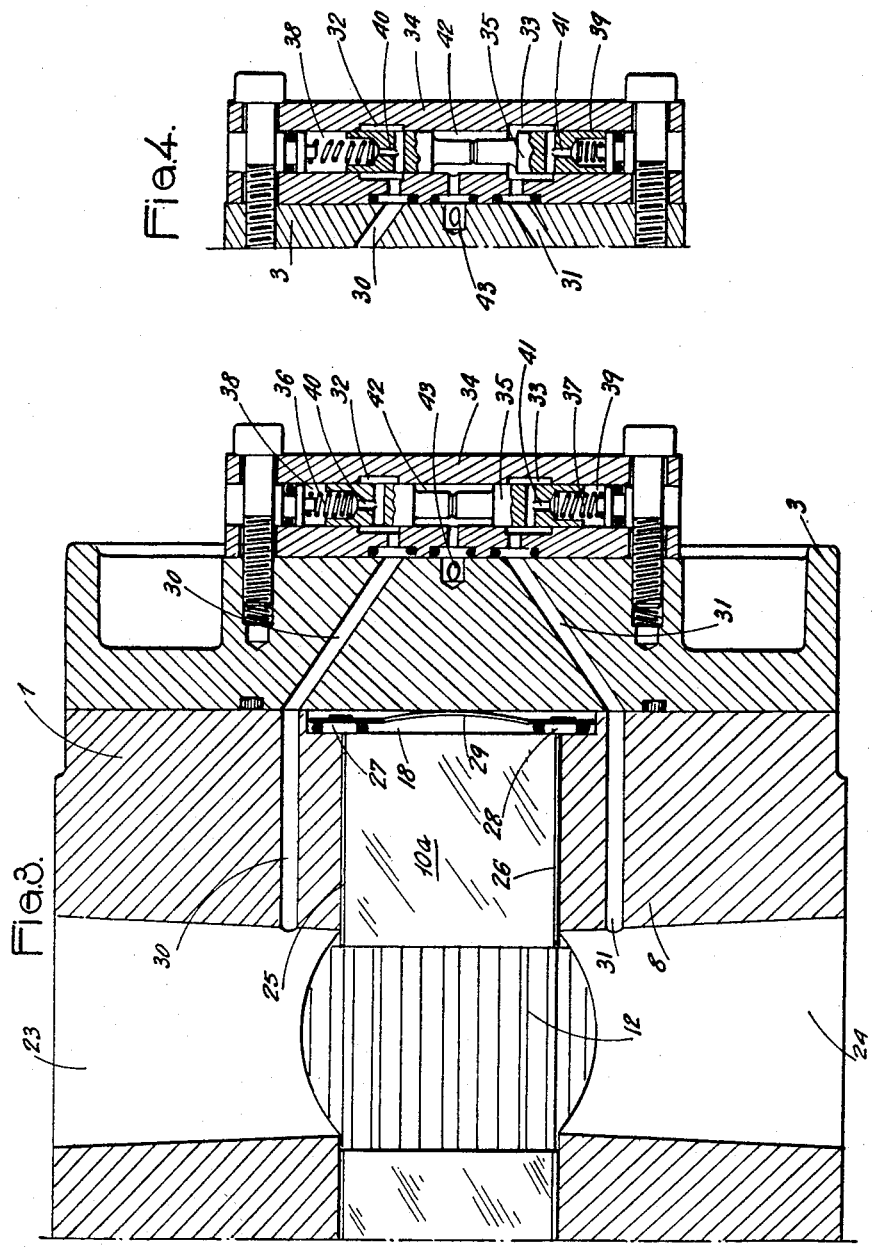

United States Patent Office 3,172,366
Patented Mar. 9, 1965

3,172,366
HYDRAULIC ENERGY CONVERTING DEVICE
Roger Laumont, Nogent-sur-Marne, Seine, France, assignor to Hydro-Meca, Paris, Seine, France, a company of France
Filed July 18, 1961, Ser. No. 124,904
Claims priority, application France, Mar. 28, 1961, 857,088, Patent 1,311,129
3 Claims. (Cl. 103—126)

The present invention relates to a hydraulic device for converting energy and more particularly it relates to a device capable of working either as a reversible hydraulic pump, or as a reversible hydraulic motor.

The invention applies more particularly to a device of the kind mentioned above, which comprises, as conversion elements, rotary components, such as engaged pinions and mobile blade rotors.

To obtain high volumetric outputs heretofore it has not been economically feasible in the case of geared pumps or hydraulic motors, to dispose rotary elements, such as pinions, in a hollow body provided with fixed end plates.

The clearances between the pinions and end plates must be extremely small to prevent any leakage that might rapidly lower the output of the device. Also these clearances must remain constant whatever the working conditions of temperature and pressure. The clearances must not be too small for this would run the risk of breaking the lubricating oil film that must ensure sufficiently smooth working between the pinions or other revolving elements and the end plates between which they are placed.

Conversion devices of this kind are known in which the pinions are placed between axially mobile end plates on which the delivery pressure of the pump is exerted, or on which the inlet pressure of the motor is exerted. This arrangement is satisfactory in special cases, but has proven to be unsuitable for use in numerous cases when the high and low pressures prevailing in the device are two variable functions, as is the case when several pumps or several motors are placed successively in a series arrangement or a parallel arrangement.

The present invention has as its principal object provision of a new energy converting device in which the pressure exerted on the end faces of the rotary elements is dependent on the different pressures prevailing no matter what the rotation direction of the device and its method of converting energy.

According to the invention, the hydraulic energy converting device, intended to work either as a motor or pump in any rotation direction, comprises at least one rotary element whose end faces are disposed between two flat thrust members, at least one of these thrust members being axially movable and being subjected on part of its surface to the action exerted by the high pressure prevailing in the device, whereas another part of the surface of this movable member is subjected to the action of the low pressure prevailing in said device, so that the pressure exerted by the movable member on the rotary element is an additive function of the high and low pressures.

Various other characteristics of the invention will be revealed by the detailed description which follows.

A form of carrying out the invention is shown by way of example, in the accompanying drawing.

FIGURE 3 is a partial section taken along the line III—III of FIG. 1.

FIGURE 4 is a partial section of one of the components shown in FIG. 3, illustrating a characteristic position of some of the elements comprised by this component.

Figure 1:
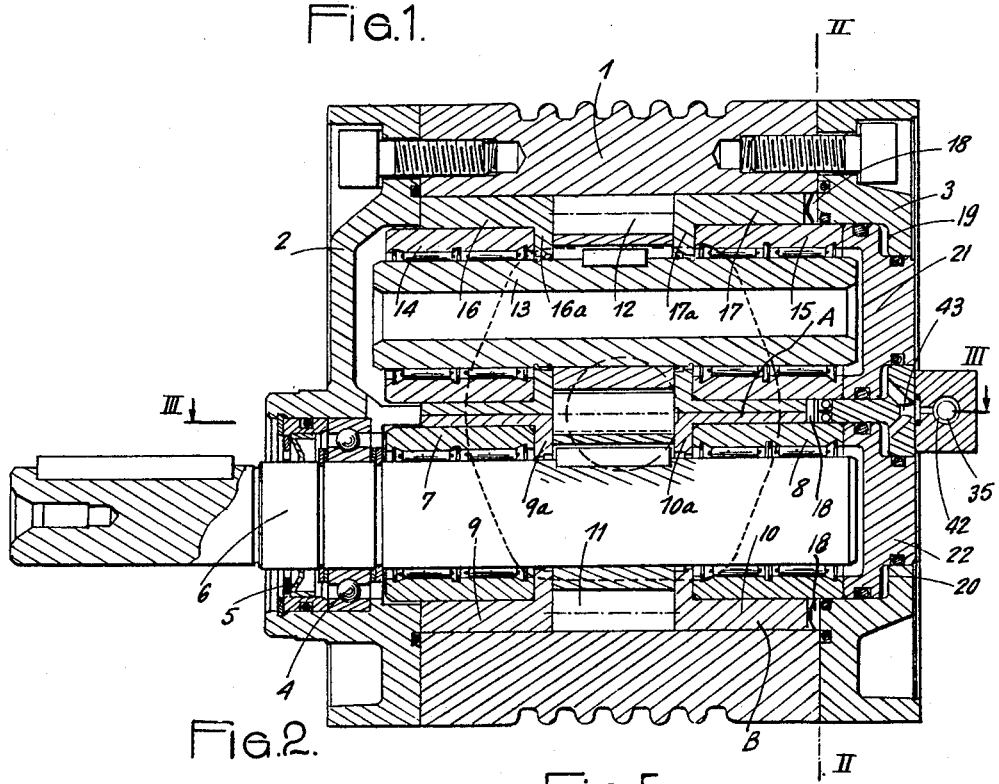
FIGURE 1 is a longitudinal section of a reversible pump or hydraulic motor embodying the invention.
Figure 2:
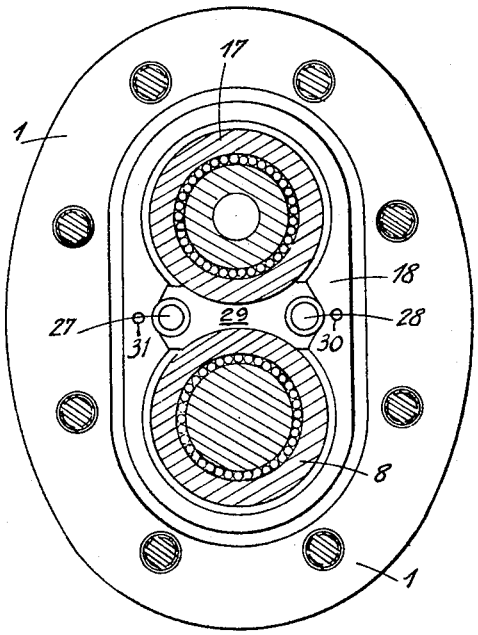
FIGURE 2 is a cross-section taken along the line II—II of FIG. 1.

According to FIGS. 1–3, the reversible hydraulic pump, which is also able to work as a reversible hydraulic motor, comprises a casing 1 closed at its two ends by plates 2, 3.

The end plate 2 supports a bearing 4, associated with a leakproof joint 5, in which a shaft 6 is mounted to drive, or to be driven by a liquid pressure, according as to whether the device works as a pump or as a motor.

The shaft 6 is carried by bearings 7, 8 freely mounted in bushings 9, 10 themselves slidably mounted inside the casing 1. The bushings 9, 10 have flanges 9a, 10a which serve as thrust members at axial ends of a pinion 11 keyed on to the shaft 6. This pinion meshes with a second pinion 12 keyed on to a shaft 13 placed axially parallel to the shaft 6. Shaft 13 is mounted in bearings 14, 15 which are freely mounted in bushings 16, 17 whose flanged ends 16a, 17a press against the axial ends of the pinion 12.

Figure 5:
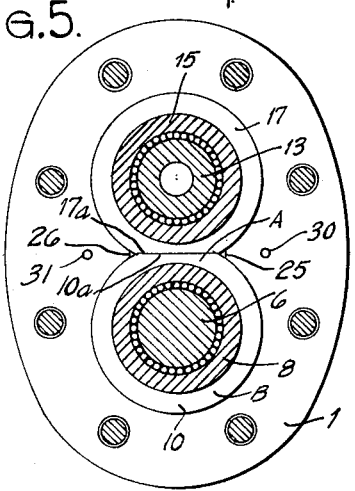
FIGURE 5 is a transverse sectional view similar to FIG. 2 on a reduced scale, except that certain automatic flap-valves forming a pressure sensitive differential valve assembly have been omitted in order to illustrate the ends of the passages controlled thereby.

The bushings 9, 16 press against the end plate 2, whereas the bushings 10, 17 are separated from the end plate 3 by a first or principal pressure chamber 18. The walls of the bushings 10 and 17 are thinner at A than at B (FIGS. 1 and 5), this difference in thickness resulting from the provision of cooperating flat lateral surfaces 10a and 17a which hold the bushings 10 and 17 against rotation. The bushings 9 and 16 are similarly arranged.

The end plate 3 delimits two secondary chambers 19, 20 in which pistons 21, 22 are arranged, respectively bearing against the bearings 15 and 8. Pistons 21, 22 are provided, as shown, with seal-tight washers, so that there is no risk of leakage of liquid when a pressure is set up in the secondary chambers 19, 20, as will be explained.

For a clear understanding of that which follows, it is assumed that the device described above is intended to work as a motor and shaft 6 is driven, as in a hydraulic motor, by a liquid under pressure admitted into the inlet port 23 as shown in FIG. 3.

This liquid under pressure is then discharged through an exhaust outlet port 24 which can also act as an inlet port if port 23 is utilized as the exhaust outlet depending on the rotation direction in which the motor shaft 6 is to be driven.

The inlet and exhaust ports 23, 24, communicate with two separate ducts or channels 25, 26 defined between casing 1 and bushings 17, 10, respectively. Channels 25, 26 communicate with the principal or primary pressure compensation chamber 18 through two automatic flap-valves 27, 28 mounted on a common rocker arm 29 so that one of the flap-valves is in open position when the other flap-valve is in closed position, and these flap-valves operate as a pressure sensitive differential valve which is responsive to the pressure differences that may exist between inlet and exhaust ports 23, 24.

The ports 23, 24 also communicate with ducts 30, 31 opening to the outside of end plate 3. These ducts can be closed by removable plugs, or can be put into communication with the chambers 32, 33 of an automatic distributor 34 fixed on the end plate 3. This automatic distributor comprises a slide valve 35, balanced by means of two opposing springs 36, 37 holding it in a middle position of the stroke that it can make, when the pressures in the ports 23, 24 are equal.

The springs 36, 37 are placed inside two chambers 38, 39 in communication by ducts 40, 41 with the chambers 32, 33 and hence by means of the channels 30, 31 respectively with the ports 23, 24.

The middle part of the slide valve 35 delimits a chamber 42 which is in communication (see FIGS. 1 and 3) by a set of channels 43, with the chambers 19, 20 each forming a secondary pressure compensation chamber.

When the device works as a motor and port 23 is an inlet a high pressure prevails in this port. This pressure applied through channel 25 on flap-valve 27 has the effect of lifting it, and consequently, flap-valve 28 is closed and the high pressure is applied in the principal compensation chamber 18.

This high pressure is exerted on the sliding bushings 10, 17 which apply flanges 10a, 17a against the end faces of the pinions 11, 12, which are in turn applied against the end flanges 9a, 16a of the bushings 9, 16 abutting against the end plate 2.

The high pressure prevailing in the port 23 is moreover applied by the duct 30 to the chamber 32 of the distributor 34, and consequently, also to the chamber 38. This pressure causes the slide valve 35 to slide downwards so that it takes the position shown in FIG. 4. In this latter position, the chamber 33 is in communication via the duct 31 with the exhaust port 24, and is put into communication with the middle chamber 42, and consequently, with the secondary compensation chambers 19, 20.

Thus, the low exhaust pressure is applied to the pistons 21, 22 which then press on the bearings 8, 15 and consequently apply on the flanges 10a, 17a of bushings 10, 17, a supplementary pressure which is derived from the delivery pressure. This supplementary pressure is in addition to the principal pressure exerted directly on bushings 10, 17, as explained above.

As may be easily understood, if the rotation direction of the motor shaft 6 is to be reversed then outlet port 24 becomes the inlet port and the inlet port 23 becomes the exhaust port, and the flap-valves 27, 28 occupy an opposite position to that described above. However, the high inlet pressure is always admitted into the principal compensation chamber 18.

Moreover, when this high pressure is admitted into the chamber 39 of the distributor 34, the slide valve 35 occupies the extreme position opposite to that shown in FIG. 4, and consequently, the low exhaust pressure is again admitted into the secondary compensation chambers 19, 20.

If we now consider that the device works as a hydraulic pump, the shaft 6 is then a driving shaft, and as in the former case, there is a pressure difference betwen the ports 23, 24. This pressure difference produces the same effect as those described above, so that in all cases regardless of the rotation direction of the pinions 11, 12, the high pressure is admitted into the principal compensation chamber 18, whereas the low pressure is admitted into the secondary compensation chambers 19, 20.

It is essential that the resultant unitary pressure that is exerted by the various bushings on the end faces of the pinions 11, 12, shall have a sufficient value so that a minimum leakage exists during the circulation of the liquid, but this resultant pressure must be such that there is no risk of breaking the film of oil that must exist between the flanges of the bushings and the end faces of the pinions, so that there is no undue wear of these components.

This result is obtained by properly calculating the effective surface of the parts of the bushings that project in the principal compensation chamber 18, as well as the effective surface of the pistons 21, 22 on which the secondary compensation pressure is acting.

It has been found advantageous, to obtain proper operation whatever the absolute pressures prevailing in the principal and secondary compensation chambers 18, 19, 20, that the surfaces on which the low pressure acts should be smaller than that on which the high pressure acts.

While I have shown and described what I believe to be the best embodiments of my invention, it will be apparent to those skilled in the art that various changes and modifications may be made therein without departing from the spirit and scope of the invention as defined in the appended claims.

I claim:

1. A hydraulic motor or pump device of the character described, comprising: a casing, rotatable meshing pinions in the casing, shafts carrying said pinions in the casing, one of said shafts protruding outside of the casing for transmission of power to and from the pinions, bushings and bearings rotatably carrying said shafts and pinions in the casing, said bushings having end flanges to delimit a cavity wherein said pinions rotate, said flanges bearing against ends of the pinions to form pressure seals thereat, an inlet port and an outlet port in the casing communicating with said cavity, said ports being separated from each other by said pinions, said ports serving to pass liquid under pressure to and from the pinions, the liquid pressure in one port being higher than that in the other port during operation of the device as the meshed pinions and the shafts rotate, the bushings at one end of said pinions being slidably mounted and having portions defining with said casing a first pressure chamber, a first pressure sensitive differential valve assembly disposed in a first hydraulic circuit which extends between both of said ports and said first pressure chamber, said valve assembly being movable automatically to place said first pressure chamber in communication with that one of the ports in which the liquid pressure is greater and to cause the slidable bushings to be pressed against the pinions in response to said greater pressure, two independent slidable piston structures in the casing defining with said casing second and third pressure chambers, respectively, said piston structures being in contact with the slidable bushings, a second pressure sensitive differential valve assembly including a cylindrical valve chamber, a valve piston member axially slidable in said valve chamber and having end portions dividing said chamber into first and second end compartments intermediate the ends of said valve piston member and the ends of said valve chamber and a central compartment intermediate said end compartments, said central compartment being shut off simultaneously from both of said end compartments with said valve piston member in a neutral position, displacement of said valve piston member from said neutral position in one direction toward said first end compartment placing said central compartment in direct communication with said first end compartment and displacement from said neutral position in the opposite direction placing said central compartment in direct communication with said second end compartment, a first passage connecting one of said ports with said first end compartment to apply pressure to one end of said valve piston member, a second passage connecting the other of said ports with said second end compartment to apply pressure to the other end of said valve piston member causing said valve piston member to be automatically displaced away from said neutral position toward the end compartment communicating with the port in which the pressure is lower thereby placing said central compartment in communication with the port of lower pressure, and a third passage interconnecting said second and third pressure chambers and said central compartment whereby both of said two piston structures are simultaneously subjected to the lower of the pressures in the two ports.

2. A hydraulic device according to claim 1, wherein the first pressure sensitive differential valve assembly includes a rocker arm having valve elements at opposite ends, said first hydraulic circuit including two separate ducts each connecting one of the ports with the first chamber, said rocker arm moving the valve elements to open the duct communicating with the port having higher liquid pressure while closing the duct communicating with the port having lower liquid pressure.

3. A hydraulic device according to claim 2, wherein said second differential valve assembly further comprises resilient means acting on said valve piston member and yieldingly urging said valve piston member toward said neutral position.

References Cited by the Examiner

UNITED STATES PATENTS

| | | | |
|---|---|---|---|
| 1,780,109 | 10/30 | Berglund | 103—126 |
| 2,420,622 | 5/47 | Roth et al. | 103—126 |
| 2,444,165 | 6/48 | Lauck | 103—126 |
| 2,627,232 | 2/53 | Lauck | 103—126 |
| 2,772,638 | 12/56 | Nagely | 103—126 |
| 2,782,724 | 2/57 | Humphreys | 103—216 |
| 2,842,066 | 7/58 | Hilton | 103—126 |
| 2,855,856 | 10/58 | Murray et al. | 103—126 |
| 2,974,605 | 3/61 | Murray | 103—216 |

FOREIGN PATENTS 1,142,537    4/57    France.

JOSEPH H. BRANSON, JR., *Primary Examiner.*

LAURENCE V. EFNER, *Examiner.*